United States Patent
He et al.

(10) Patent No.: US 11,032,634 B2
(45) Date of Patent: Jun. 8, 2021

(54) EARPIECES

(71) Applicant: Hewlett-Packard Development Company, L.P., Spring, TX (US)

(72) Inventors: Hui He, Fort Collins, CO (US); Hang Yan Yuen, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/648,821

(22) PCT Filed: Nov. 16, 2017

(86) PCT No.: PCT/US2017/061930
§ 371 (c)(1),
(2) Date: Mar. 19, 2020

(87) PCT Pub. No.: WO2019/099007
PCT Pub. Date: May 23, 2019

(65) Prior Publication Data
US 2020/0280793 A1    Sep. 3, 2020

(51) Int. Cl.
*H04R 25/00* (2006.01)
*H04R 1/10* (2006.01)

(52) U.S. Cl.
CPC ......... *H04R 1/1066* (2013.01); *H04R 1/1041* (2013.01)

(58) Field of Classification Search
CPC ............................. H04R 1/1066; H04R 1/1041
See application file for complete search history.

(56) References Cited

U.S. PATENT DOCUMENTS

| | | | |
|---|---|---|---|
| 6,512,834 B1* | 1/2003 | Banter | H04R 1/086 381/189 |
| 8,385,586 B2 | 2/2013 | Liou et al. | |
| 8,447,053 B2 | 5/2013 | Tseng et al. | |
| 8,699,740 B2 | 4/2014 | Chiang et al. | |
| 8,739,926 B1 | 6/2014 | Mori | |
| 9,344,791 B2 | 5/2016 | Zhao et al. | |
| 2008/0191354 A1* | 8/2008 | Japp | H05K 3/4602 257/759 |
| 2009/0258161 A1* | 10/2009 | Japp | H05K 3/4602 427/555 |
| 2010/0206784 A1* | 8/2010 | Weaver | B01D 11/00 210/85 |

(Continued)

FOREIGN PATENT DOCUMENTS

CN      203896493 U    10/2014

*Primary Examiner* — Simon King
(74) *Attorney, Agent, or Firm* — HP Inc. Patent Department

(57) ABSTRACT

The present disclosure is drawn to an earpiece. The earpiece can include a speaker suitable for use within or adjacent to an ear canal of a user and a layered composite associated with the speaker. The layered composite can include an expanded polytetrafluoroethylene (PTFE) layer, a self-supporting substrate applied to a first side of the expanded PTFE layer, and a fabric substrate applied to a second side of the expanded PTFE layer. The expanded polytetrafluoroethylene layer can have a pore size having an average value from 0.1 micron to 0.5 micron. The self-supporting substrate can define a contour of the earpiece.

15 Claims, 3 Drawing Sheets

(56) References Cited

U.S. PATENT DOCUMENTS

| | | | | |
|---|---|---|---|---|
| 2012/0186452 A1* | 7/2012 | Smithies | ................... | B32B 5/18 |
| | | | | 96/9 |
| 2013/0308809 A1* | 11/2013 | Thompson | ........... | H04R 1/2834 |
| | | | | 381/332 |
| 2016/0247499 A1* | 8/2016 | Sanders | .................. | B32B 37/12 |
| 2017/0006369 A1 | 1/2017 | Kenaley et al. | | |

* cited by examiner

| 106 |
|---|
| 102 |
| 104 |

| (a) |
|---|
| 106 |
| 102 |
| (b) |
| 104 |

EARPIECES

BACKGROUND

Earpieces are a popular accessory for use in connection with electronic devices. Individuals utilize earpieces while watching television, using hand held devices, browsing the internet, communicating with others, listening to audio materials, gaming, etc. These accessories can come in a variety of styles and configurations, and as individuals continue to utilize earpieces more and more, the demand improvements continue to rise.

BRIEF DESCRIPTION OF DRAWINGS

Additional features and advantages of the disclosure will be apparent from the detailed description which follows, taken in conjunction with the accompanying drawings, together illustrating, by way of examples, features of the present technology. It should be understood that the figures are representative of examples of the present disclosure and should not be considered as limiting the scope of the disclosure.

DETAILED DESCRIPTION

Figure 1A:
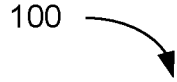
FIG. 1A graphically depicts an example of a layered composite in accordance with the present disclosure.

Individuals utilize earpieces and headsets in a variety of manners while engaging in a variety of activities. Extended periods of use and/or activity can present issues relating to comfort and damage. For example when an individual wears an earpiece for an extended period of time, the individual's ears can become hot and wearing of the earpiece can become uncomfortable. In another example, if an individual produces sweat while wearing an earpiece, the sweat can become trapped in the earpiece. This moisture can sometimes affect sound quality and damage electronics. Thus, an earpiece that is breathable and protects electronic components from moisture, e.g., preventing moisture from getting in and/or allowing perspiration moisture to escape, could improve the comfort, sound quality, and/or life of such earpieces.

In accordance with this, the present disclosure relates generally to earpieces. An earpiece can include, for example, a speaker suitable for use within or adjacent to an ear canal of a user and a layered composite associated with the speaker. The layered composite can include an expanded polytetrafluoroethylene (PTFE) layer, a self-supporting substrate that can be applied to a first side of the expanded PTFE layer, and a fabric substrate that can be applied to a second side of the expanded PTFE layer. The expanded PTFE layer can have a pore size having an average value from 0.1 to 0.5 microns (also referred to herein as "average pore size"). The self-supporting substrate can define a contour of the earpiece.

In one example, the expanded PTFE layer can have a pore size having an average value from 0.3 micron to 0.5 micron, and can range from 0.01 micron to 100 micron. In another example, the expanded PTFE layer can have a level of porosity ranging from 1% to 99%, and/or can include from 1 million to 15 billion pores per square inch. In yet another example, the expanded PTFE layer can include an oleophobic treatment, a hydrophobic treatment, or both an oleophobic treatment and hydrophobic treatment applied thereto. In further detail, the self-supporting substrate can be perforated. In another example, the self-supporting substrate can include a metal or a metal alloy selected from steel, titanium, lithium, aluminum, magnesium, nickel, copper, manganese, tungsten, gold, silver, zinc, platinum, molybdenum, or a combination thereof; or can include a polymer selected from polycarbonate (PC), acrylonitrile butadiene styrene (ABS), polycarbonate-acrylonitrile butadiene styrene blend (PB/ABS), polypropolyne, polyglycolide, polyglycolic acid, polylactic acid, polycaprolactone, polyhydroxyalkanoate, polyhydroxybutyrate, polyethylene adipate, polybutylene succinate, poly(3-hydroxybutyrate-co-3-hydroxyvalerate), polyethylene terephthalate, polybutylene terephthalate, polytrimethylene terephthalate, polyethylene naphthalate, nylon, polyamide having a weight average molecular weight ranging from 70,000 Mw to 300,000 Mw, or a combination thereof. In a further example, the fabric substrate can include a woven or fibrous layer which can include ceramic fibers, metal fibers, metal alloy fibers, metal oxide fibers, semi-metal oxide fibers, silicate fibers, glass fibers, carbon fibers, boron fibers, nitride fibers, polymer fibers, leather, or a combination thereof. In another example, the earpiece can include a bonding layer between the expanded PTFE layer and the self-supporting substrate, wherein the bonding layer can include an adhesive, a sealant, a mechanical fastener, a thermal fastener or a combination thereof. In yet another example, the earpiece can further include a polymeric abrasion-resistant shell that can be positioned adjacent to the fabric substrate at an opposite surface thereof relative to the expanded PTFE layer. In a further example, the earpiece can be configured so that the speaker can be positionable proximal to an ear of a user and relative to the self-supporting substrate.

In yet another example, a headset can include a headpiece associated with an earpiece. The earpiece can include a speaker that can be suitable for use within or adjacent to an ear canal of a user, as well as a layered composite associated with the speaker. The layered composite can include an expanded PTFE layer, a self-supporting substrate that can be applied to a first side of the expanded PTFE layer, and a fabric substrate that can be applied to a second side of the expanded PTFE layer. The expanded PTFE layer can have a pore size having an average value from 0.1 micron to 0.5 micron. The individual pores in the expanded PTFE layer can range from 0.01 micron to 100 micron. The self-supporting substrate can define a contour of the earpiece. In one example, the earpiece can be configured so that the speaker can be positional proximal to the ear canal relative to the self-supporting substrate. The headset can also include a microphone associated therewith.

In a further example, a method of manufacturing an earpiece can include treating an expanded PTFE layer with an oleophobic composition, a hydrophobic composition, or both the oleophobic composition and the hydrophobic composition; forming a layered composite by laminating a second side of the expanded PTFE layer to a fabric layer; and bonding a first side of the expanded PTFE layer to a self-supporting substrate which can include a perforated metal or polymeric substrate that can have a structure defines a contour of the earpiece. The method can further include positioning the layered composite adjacent to a speaker. The speaker can be positioned proximally with respect to the self-supporting substrate and distally with respect to the fabric substrate, or vice versa, depending on the particular arrangement. The expanded PTFE layer can have a pore size having an average value from 0.1 micron to 0.5 micron. The individual pores in the PTFE layer can have a pore size that can range from 0.01 micron to 100 micron. In one example, forming the layered composite can include laminating followed by bonding. In a further example, the method can further include positioning a polymeric abrasion-resistant shell adjacent to the fabric substrate at an opposite surface thereof relative to the expanded PTFE layer.

It is noted that when discussing the earpiece, the headset, and the method of manufacturing an earpiece, each of these discussions can be considered applicable to other examples whether or not they are explicitly discussed in the context of that example unless expressly indicated otherwise. Thus, for example, in discussing an expanded PTFE layer related to an earpiece, such disclosure is also relevant to and directly supported in context of the headset, the method of manufacturing the earpiece, and vice versa.

As mentioned, the present disclosure relates to an earpiece generally, as well as a headset and a method of manufacturing an earpiece. The earpiece can be configured as part of a standard headset (e.g., headband and earmuff configuration), an in-ear earpiece, an over the ear earpiece, or as a collar that can be worn around the next and close to the ears. The type of earpiece can be determined based on the intended use and design feature. For example, a Bluetooth device that incorporates an earpiece can have a different structure than other types of headsets that require the use of a wire. The structure of the earpiece can include a speaker and the layered composite. The speaker itself is not particularly limited, however, as long as the speaker is appropriately sized and shaped to be used within the ear-canal or adjacent to the ear of a user. The speaker can be a wired or wireless speaker. The speaker can have a variety of volume ranges, etc.

The relationship between the speaker to the layered composite can also vary. For example, the speaker can be surrounded by the layered composite material. In another example, the speaker can be located either adjacent to the self-supporting substrate or adjacent to the fabric substrate (with or without layers there between). In yet another example, the speaker can be positionable proximal to an ear of a user relative to the self-supporting substrate. In a further example, the speaker can be positionable proximal to an ear of a user relative to the fabric substrate. In still other examples, the layered composite can be positionable between the speaker and an ear of the user, or the speaker can be positional between the layered composite and the ear of the user. Furthermore, the speaker can be positioned within a pocket comprising the layered composite, where the layered composite is on both sides of the speaker, or on one side of the speaker and a different type of material or layered material is on another side of the speaker, etc.

Turning to the layered composite per se, in one example as shown in FIG. 1A, the layered composite 100 can include an expanded PTFE layer 102, a self-supporting substrate 104, and a fabric substrate 106. The relationship of the self-supporting substrate and the fabric substrate to the expanded PTFE layer can be such that the self-supporting substrate can be located on one side of the expanded PTFE layer and that the fabric substrate can be on the other side of the expanded PTFE layer. When describing this relationship herein, terms such as a first side and a second side can be used. These terms are included solely to designate the relationship of the self-supporting substrate and/or the fabric substrate to the expanded PTFE layer.

The expanded PTFE layer can be a synthetic fluoro-polymer of tetrafluoroethylene. This fluoro-polymer generally has a repeating fluorocarbon chain, and can have a weight average molecular weight from 5,000 Mw to 100,000 Mw, for example. Expanded PTFE differs from PTFE in that it incorporates pores. For example, expanded PTFE can have a plurality of pores with a pore size having an average value from 0.1 micron to 0.5 micron. The individual pores in the PTFE layer can have a pore size that can range from 0.01 micron to 100 micron. As used herein, "average pore size" or "pore size having an average value" refers to the collective size of all of the pores, taken as an average. When presented as a range of average pore sizes, the range designates a low limit and a high limit for the average pore size. For example a pore size having an average value of 0.1 micron can include pores having a pore size of 0.1 micron, 0.09 micron, 0.11 micron, 0.08 micron, 0.012 micron, etc. When the collective pore sizes are averaged, the resultant average is indicated as the average pore size. In some examples, the average pore size can range from 0.1 micron to 0.5 micron, from 0.1 micron to 0.4 micron, from 0.1 micron to 0.3 micron, from 0.2 micron to 0.5 micron, or from 0.3 micron to 0.5 micron. In one example, the expanded PTFE layer can have an average pore size ranging from 0.3 micron to 0.5 micron.

The level of porosity, e.g. the amount of pores can also vary. In one example, the expanded PTFE layer can have a dimensional level of porosity that can range from 1% to 99%. In other examples, the level of porosity can range from 10% to 90%, from 20% to 80%, from 15% to 85%, from 30% to 60%, from 50% to 95%, from 60% to 99%, from 70% to 85%, from 85% to 99%, from 90% to 99%, from 95% to 99%, from 96% to 99%, from 97% to 99%, from 98% to 99%, or can be 99%. The level of porosity can be determined by inspection under optical or electronic microscopes and software counting.

In some examples, the expanded PTFE layer can include from 1 million to 15 billion pores per square inch. In another example, the expanded PTFE layer can include from 5 million to 15 billion pores per square inch. In further examples the expanded PTFE layer can include from 10 million to 50 million pores per square inch, from 1 billion to 10 billion pores per square inch, or from 3 billion to 12 billion pores per square inch. In one example, the expanded PTFE layer can have a level of porosity from 1% to 99%, and can include 1 million to 15 billion pores per square inch.

With respect to the layer of the expanded PTFE, the layer can have varying density as well. In one example, the expanded PTFE layer can have a density ranging from 0.1 g/cm$^3$ to 2.2 g/cm3. In other examples, the expanded PTFE layer can have a density ranging from 0.5 g/cm$^3$ to 2 g/cm$^3$, from 1 g/cm$^3$ to 1.5 g/cm$^3$, or from 0.2 g/cm$^3$ to 2 g/cm$^3$.

The thickness of the expanded PTFE layer can also vary. In one example, the expanded PTFE layer can have a thickness ranging from 0.005 mm to 2 mm. In other examples the expanded PTFE layer can have a thickness ranging from 0.01 mm to 1.5 mm, from 0.05 mm to 2 mm, from 0.005 mm to 1 mm, or from 0.1 mm to 1 mm.

The expanded PTFE layer can be permeable to gasses, including air and water vapor, but can be impermeable to liquids. Accordingly, the expanded PTFE layer can exhibit liquid repellency. This repellency can be partially due to the pore size. An average pore size ranging from 0.1 micron to 0.5 micron can be about one ten-thousandth as the size of a drop of liquid (e.g., a raindrop). Thus, a drop of liquid cannot pass through the pores while vapor (e.g., water vapor, etc.) can pass through the pores.

The air and gas permeability can be reflected in the Frazier number of the expanded PTFE layer. The Frazier number can be determined using ASTM D737 Standard Test Methods for Air Permeability of Textile Fabrics, version 04 (2016). In one example, the expanded PTFE layer can have a Frazier number ranging from 0.1 to 500. In other examples, the expanded PTFE layer can have a Frazier number from 0.2 to 450, from 0.5 to 400, from 0.8 to 350, from 1 to 300, from 5 to 250, from 10 to 200, from 20 to 150, from 40 to 100, from 60 to 80, from 100 to 300, from 150 to 250, from 0.5 to 15, from 0.6 to 10, from 0.8 to 8, from 0.9 to 5, from 1 to 4, from 0.8 to 8, from 0.9 to 5, or from 1 to 4, among other possibilities.

In addition, the expanded PTFE layer can exhibit a high contact angle with liquid. As used herein, "a high contact angle" can refer to a contact angle equal to or greater than 90°. For example, a contact angle with liquid for the expanded PTFE layer can be at least 90°, at least 95°, at least 100°, at least 105°, at least 110°, at least 115°, at least 120°, at least 125°, at least 130° or higher. In one example, a contact angle with liquid can be 118°. The contact angle can contribute to the liquid repellency of the expanded PTFE layer. One commercially available example of an expanded PTFE material that can be suitable for use in the layered composite can include Gore-Tex® (W.L Gore & Associates, Inc. Delaware).

In some examples, the expanded PTFE layer can be treated. For example, the expanded PTFE layer can include an oleophobic treatment, a hydrophobic treatment, or both an oleophobic treatment and hydrophobic treatment applied thereto. A hydrophobic treatment can be used to further increase the water repellency of the expanded PTFE layer. A hydrophobic treatment can include at least one of spray coating, dip-coating, chemical vapor deposition (CVD), and physical vapor deposition (PVD) of hydrophobic materials. Exemplary hydrophobic materials can include fluoropolymer, parylene, and combinations thereof. An oleophobic treatment can be used to make the expanded PTFE layer resistant to oils. An oleophobic treatment can include at least one of spray coating, dip-coating, CVD, or PVD of oleophobic materials. Exemplary oleophobic materials can include fluoropolymer, parylene, and combinations thereof.

A self-supporting substrate can be applied to a first side of the expanded PTFE layer. The self-supporting substrate can serve as a structure providing substrate. In one example, the structure can be in addition to and separate of the structure provided by the speaker. The shape of the self-supporting structure can vary depending on the desired application and the relationship of the layer composite to the speaker. In some examples, the structure of the self-supporting substrate can provide structure to the layered composite. In other examples, the structure of the self-supporting substrate can provide contour to the earpiece.

The composition of the self-supporting structure can vary. In one example, the self-supporting substrate can be a metal or metal alloy. The metal or metal alloy can be steel, titanium, lithium, aluminum, magnesium, nickel, copper, manganese, tungsten, gold, silver, zinc, platinum, molybdenum, or a combination thereof. In another example, the self-supporting substrate can be a polymer. In one example, the polymer can be polycarbonate (PC), acrylonitrile butadiene styrene (ABS), polycarbonate-acrylonitrile butadiene styrene blend (PB/ABS), polyglycolide, polyglycolic acid, polylactic acid, polycaprolactone, polyhydroxyalkanoate, polyhydroxybutyrate, polyethylene adipate, polybutylene succinate, poly(3-hydroxybutyrate-co-3-hydroxyvalerate), polyethylene terephthalate, polybutylene terephthalate, polytrimethylene terephthalate, polyethylene naphthalate, nylon, polyamide having a weight average molecular weight ranging from 70,000 Mw to 300,000 Mw, or a combination thereof.

In one example, the self-supporting structure can be a polyamide having a weight average molecular weight ranging from 70,000 Mw to 300,000 Mw. Exemplary polyamides can include nylon PA 11 ("PA-11"), nylon PA 12 ("PA-12"), nylon PA 6 ("PA-6"), nylon PA 8 ("PA-8"), nylon PA 9 ("PA-9"), nylon PA 66 ("PA-66"), nylon PA 612 ("PA-612"), nylon PA 812 ("PA-812"), nylon PA 912 ("PA-912"), and the like. In one example, the nylon can be a high molecular weight nylon—e.g., polyamide 12, polyamide 6, polyamide 8, polyamide 11, polyamide 66, and combinations thereof.

The thickness of the self-supporting structure can also vary. In one example, the thickness can range from 0.05 mm to 5 mm. In other examples, the thickness can range from 0.1 mm to 5 mm, from 0.05 mm to 3 mm, from 0.1 mm to 3 mm, from 0.5 mm to 4 mm, or from 1 mm to 5 mm.

In some examples, the self-supporting structure can be perforated. Perforating this substrate can permit vapor transfer through this layer of the layered composite. When perforated, the pores can vary in size and amount. For example, pores in the self-supporting structure can range from 0.01 microns to 100 microns. In yet other examples the pores in the self-supporting structure can range from 0.01 micron to 50 micron, from 0.1 micron to 75 micron, or from 1 micron to 100 micron. The quantity of pores can also vary. For example, the self-supporting structure can have a level of porosity of ranging from 1% to 99%. In yet other examples, the level of porosity for the self-supporting structure can range from 5% to 85%, from 10% to 99%, from 30% to 60%, from 25% to 75%, or from 1% to 50%.

The layered composite can further include a fabric substrate. The fabric substrate can be applied to a second side of the expanded PTFE layer. In one example, the fabric substrate can include a woven or fibrous layer. The woven or fibrous layer can include includes ceramic fibers, metal fibers, metal alloy fibers, metal oxide fibers, semi-metal oxide fibers, silicate fibers, glass fibers, carbon fibers, boron fibers, nitride fibers, polymer fibers, leather, or a combination thereof.

In one example, the fabric substrate can be a metal fiber, a metal alloy fiber, a metal oxide fiber, a semi-metal oxide fiber, or a combination thereof. Exemplary metal, metal alloy, or metal oxide fibers can include titanium fibers, ruthenium fibers, rhodium fibers, palladium fibers silver fibers, osmium fibers, iridium fibers, platinum fibers, gold fibers, mercury fibers, rhenium fibers, copper fibers, niobium fibers, tantalum fibers, alloys, or combinations thereof.

In another example, the fabric substrate can include a glass fiber. Exemplary glass fibers can include alumino-burosilicate glass fibers, alumino-lime silicate fibers, alumino-silicate glass fibers, alkali-lime glass fibers, or a combination thereof.

In yet another example, the fabric substrate can be a carbon fiber.

Exemplary carbon fibers can include natural carbon fibers and/or synthetic carbon fibers. For example, the carbon fiber can be formed of polyacrylonitrile ("PAN"), rayon, pitch, carbon nanotube fibers, aramid carbon fibers, or a combination thereof.

In some examples, the fibers can include continuous fibers, discontinuous fibers, or a combination thereof. The diameter of the fibers can also vary. In some examples, the fibers can have an average diameter ranging from 5 µm to 10 µm. In yet other examples, the fibers can have an average diameter ranging from 6 µm to 8 µm, from 5 µm to 7 µm, or from 6 µm to 10 µm.

The individual fibers can be arranged in various orientations and/or directions in this layer. In one example, the fibers can be aligned uni-directionally. Uni-directionally aligned fibers can exhibit isotropic material properties and can exhibit stronger mechanical properties (e.g., elastic modulus, flexural modulus, etc.) along a uni-directional alignment than the same type of fibers that are aligned in an orthogonal direction. As used herein, uni-directional aligned fibers refer to fibers in a fabric layer having at least 80% of the fibers by volume, aligned in the same direction. Orthogonal direction refers to aligned fibers in a fabric layer having 79% or fewer fibers by volume, aligned in different directions.

The fibers in the fiber layer can be woven. Woven fibers can be in various possible formats including plain, twill, satin, triaxial, stitched, basket, continuous strand mat, and/or veil formats.

Figure 1B:
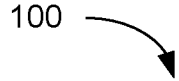
FIG. 1B graphically depicts another example of a layered composite in accordance with the present disclosure.

In some examples, the layered composite 100 can further include additional layers, such as those shown in FIG. 1B. These layers can be included to enhance properties or features of layered composite, the earpiece, or both. For example, in addition to the layered composite components described in FIG. 1A, namely the expanded PTFE layer 102, the self-supporting substrate 104, and the fabric substrate 106, the layered composite can also include a bonding layer, shown at (b), between individual layers of the composite, between the layered composite and additional layers, or between the layered composite and the speaker. It is shown at one single location for convenience, but could be included to bond any two layers together. In one example, the bonding layer can be located between at least one of the expanded PTFE layer and the self-supporting substrate, the expanded PTFE layer and the fabric substrate, the fabric substrate and a polymeric abrasion resistant shell, the self-supporting substrate and a polymeric abrasion resistant shell, or a combination thereof. The type of bonding can also vary. In one example, a bonding layer can be an adhesive, a sealant, a mechanical fastener, thermal fastener, or a combination thereof. A bonding layer can be used to adhere individual layers to other layers.

In yet other examples, the layered composite 100 can further include an abrasion resistant layer, shown at (a). This layer can be used to protect the structure of the earpiece. In one example, the abrasion resistant layer can be a polymeric-abrasion resistant shell. In some examples, the polymeric-abrasion resistant shell can include an acrylic polymer, alkyd polymer, epoxy polymer, or a co-polymer thereof. The polymeric-abrasion resistant shell can be located on the exterior of the earpiece and/or on the interior of the earpiece. In one example, the polymeric-abrasion resistant shell can be adjacent to the fabric substrate at an opposite surface thereof relative to the expanded PTFE layer. In another example, the polymeric-abrasion resistant shell can be located adjacent to the self-supporting substrate at an opposite surface thereof relative to the expanded PTFE layer. In yet another example, the polymeric-abrasion resistant shell can be adjacent to the speaker and the layered composite.

Figure 2:
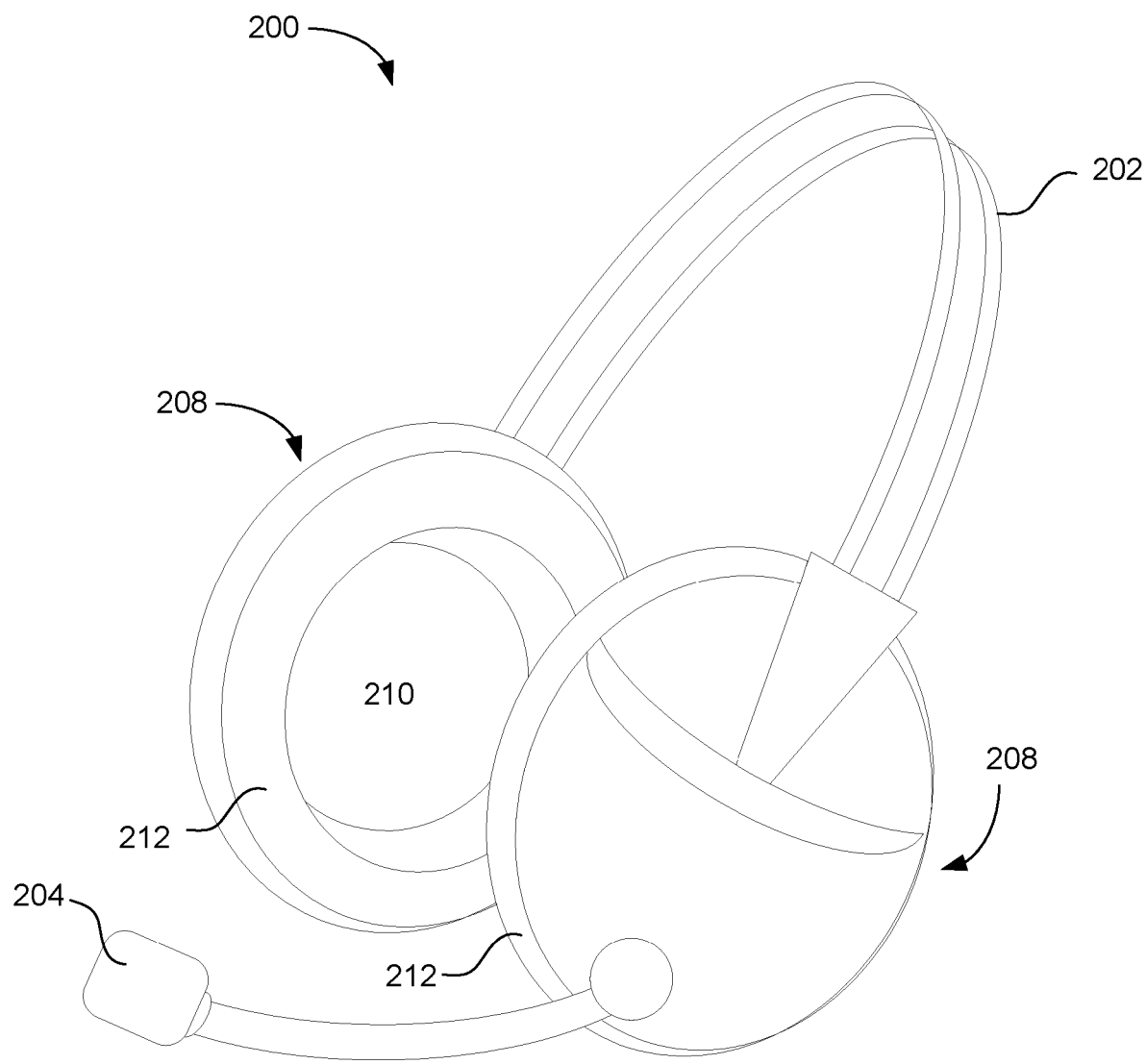
FIG. 2 graphically depicts an example headset in accordance with the present disclosure.

Further presented herein is a headset. As shown in FIG. 2, the headset 200 can include a headpiece 202 associated with a microphone 204 and an earpiece 208. In one example, the earpiece 208 can include a speaker 210 suitable for use within or adjacent to an ear canal of a user and a layered composite 212 associated with the speaker. That being stated, the layered composite can likewise be associated with an ear cushion, other areas of the earpiece, or both. The layered composite can include an expanded PTFE layer that can have an average pore size ranging from 0.1 micron to 0.5 micron; a self-supporting substrate that can be applied to a first side of the expanded PTFE layer and can define a contour of the earpiece; and a fabric substrate that can be applied to a second side of the expanded PTFE layer. The earpiece, speaker, and layered composite can be as described above. In some examples, the earpiece can be configured so that the speaker can be positioned proximal to the ear canal relative to the self-supporting substrate. In some examples, the microphone can include the layered composite described above.

The style of the headset can vary to include any style of headset available for use. In some specific examples, the headset can be a single earpiece device such as a Bluetooth headset. The headpiece in a Bluetooth headset can be an ear clip. For example, a headpiece in this or other examples can transfer the weight of the headset to the user's head. In another example, the headset can include two earpieces and can be structured as headband styled headphones or a gaming headset. In this type of headset, the headpiece can be a headband.

The headset can include a variety of features. These features can include but are not limited to, detachable wiring, volume slider, carrying case, etc. In some examples, the headset can be a wired headset or a wireless headset.

Figure 3:
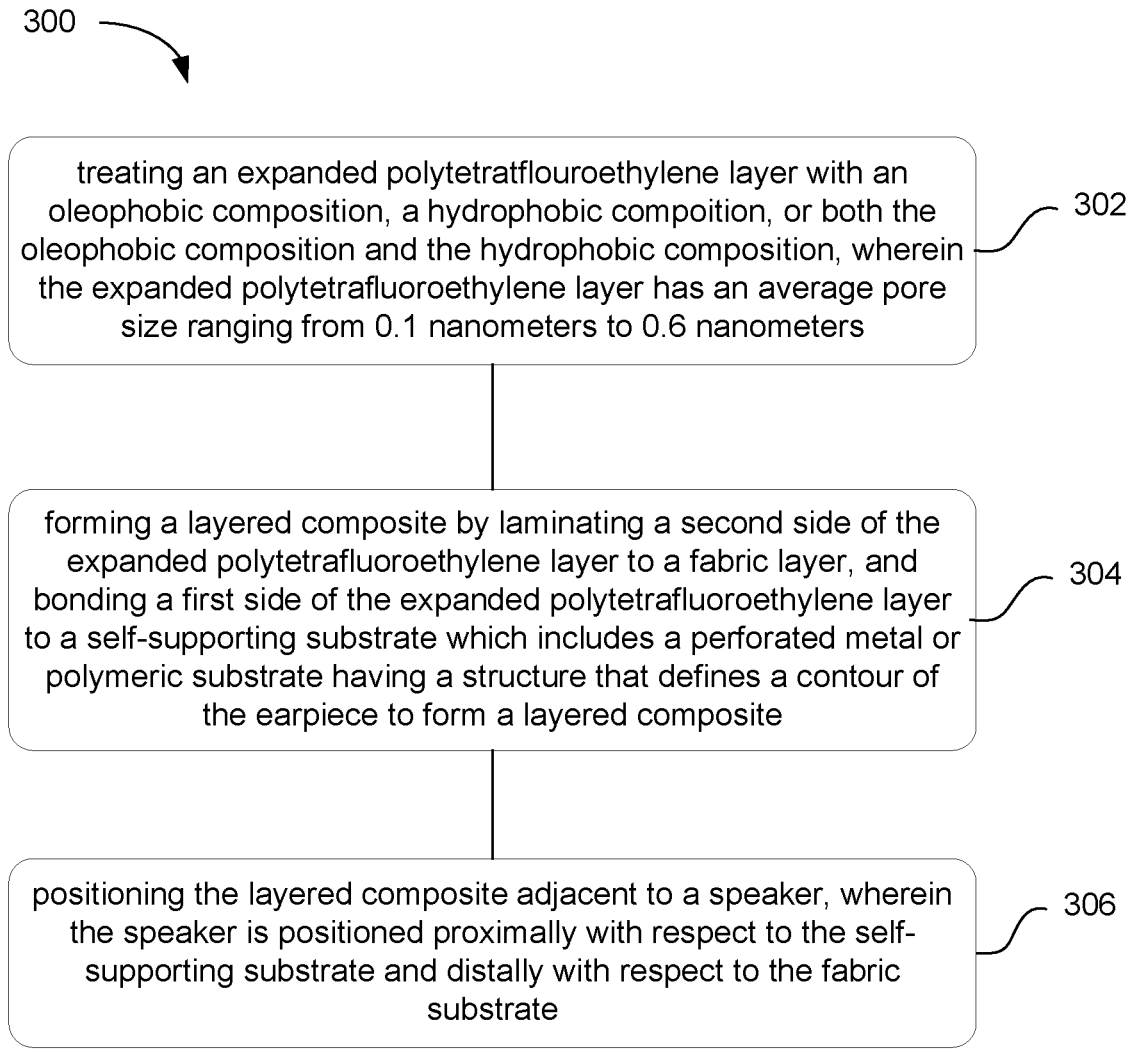
FIG. 3 provides a flow chart for an example method of manufacturing an earpiece in accordance with the present disclosure.

In yet another example presented herein, is a method 300 of manufacturing an earpiece is shown at FIG. 3, and can include treating 302 an expanded PTFE layer with an oleophobic composition, a hydrophobic composition, or both the oleophobic composition and the hydrophobic composition; forming 304 a layered composite by laminating a second side of the expanded PTFE layer to a fabric layer, and bonding a first side of the expanded PTFE layer to a self-supporting substrate; and positioning 306 the layered composite adjacent to a speaker. The expanded PTFE layer can have an average pore size ranging from 0.1 micron to 0.5 micron. The self-supporting substrate can be a perforated metal or polymeric substrate having a structure that defines a contour of the earpiece to form a layered composite. The speaker can be positioned proximally with respect to the self-supporting substrate and distally with respect to the fabric substrate. In some examples, forming the layered composite can further include laminating followed by bonding. In one example, the method can further include positioning a polymeric abrasion-resistant shell adjacent to the fabric substrate at an opposite surface thereof relative to the expanded PTFE layer.

In some examples, laminating the expanded PTFE layer to the fabric layer can include exposing the fabric layer to a temperature near, at, and/or above a glass transition temperature and/or melting temperature of fibers in the fabric layer and contacting the fabric layer with the expanded PTFE layer to mechanically couple the fabric layer to the expanded PTFE layer. In another example, alternatively, or in addition to the laminating, an adhesive, sealant, a mechanical fastener, and/or a thermal fastener can be employed to couple the fabric layer to the expanded PTFE layer.

In one example, the self-supporting substrate can be die cast, precision milled (e.g., computer numerical controlled milling), printed, and/or otherwise produced. In some examples, bonding the first side of the expanded PTFE layer to the self-supporting substrate can include applying an adhesive layer to the face of the self-supporting substrate and positioning the laminate at least partially over the adhesive layer.

In some examples, the method can further include applying a hydrophobic and/or an oleophobic material to the laminate, the porous fluoro-polymer layer, the fabric layer, and/or a finish layer through various manners of applications. Exemplary manners of application can include lamination, spray coating, dip coating, chemical vapor deposition, and physical vapor deposition, among other possible manners of application of the hydrophobic and/or an oleophobic material.

It is noted that, as used in this specification and the appended claims, the singular forms "a," "an," and "the" include plural referents unless the content clearly dictates otherwise.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight ratio range of 1 wt % to 20 wt % should be interpreted to include not only the explicitly recited limits of 1 wt % and 20 wt %, but also to include individual weights such as 2 wt %, 11 wt %, 14 wt %, and sub-ranges such as 10 wt % to 20 wt %, 5 wt % to 15 wt %, etc.

What is claimed is:

1. An earpiece, comprising:
   a speaker suitable for use within or adjacent to an ear canal of a user; and
   a layered composite associated with the speaker, the layered composite, including:
   an expanded polytetrafluoroethylene layer with a pore size having an average value from 0.1 micron to 0.5 micron;
   an self-supporting substrate applied to a first side of the expanded polytetrafluoroethylene layer, wherein the self-supporting substrate defines a contour of the earpiece; and
   a fabric substrate applied to a second side of the expanded polytetrafluoroethylene layer.

2. The earpiece of claim 1, wherein the expanded polytetrafluoroethylene layer has a pore size having an average value from 0.3 micron to 0.5 micron.

3. The earpiece of claim 1, wherein the expanded polytetrafluoroethylene layer has a level of porosity ranging from 1% to 99%, and includes from 1 million to 15 billion pores per square inch.

4. The earpiece of claim 1, wherein the expanded polytetrafluoroethylene layer includes an oleophobic treatment, a hydrophobic treatment, or both an oleophobic treatment and hydrophobic treatment applied thereto.

5. The earpiece of claim 1, wherein the self-supporting substrate is perforated.

6. The earpiece of claim 1, wherein the self-supporting substrate comprises a metal or a metal alloy selected from steel, titanium, lithium, aluminum, magnesium, nickel, copper, manganese, tungsten, gold, silver, zinc, platinum, molybdenum, or a combination thereof; or comprises a polymer selected from polycarbonate, acrylonitrile butadiene styrene, polycarbonate-acrylonitrile butadiene styrene blend, polyglycolide, polyglycolic acid, polylactic acid, polycaprolactone, polyhydroxyalkanoate, polyhydroxybutyrate, polyethylene adipate, polybutylene succinate, poly(3-hydroxybutyrate-co-3-hydroxyvalerate), polyethylene terephthalate, polybutylene terephthalate, polytrimethylene terephthalate, polyethylene naphthalate, nylon, polyamide having a weight average molecular weight ranging from 70,000 Mw to 300,000 Mw, or a combination thereof.

7. The earpiece of claim 1, wherein the fabric substrate comprises a woven or fibrous layer which includes ceramic fibers, metal fibers, metal alloy fibers, metal oxide fibers, semi-metal oxide fibers, silicate fibers, glass fibers, carbon fibers, boron fibers, nitride fibers, polymer fibers, or a combination thereof.

8. The earpiece of claim 1, further comprising a bonding layer between the expanded polytetrafluoroethylene layer and the self-supporting substrate, wherein the bonding layer includes an adhesive, a sealant, a mechanical fastener, a thermal fastener, or a combination thereof.

9. The earpiece of claim 1, further comprising a polymeric abrasion-resistant shell positioned adjacent to the fabric substrate at an opposite surface thereof relative to the expanded polytetrafluoroethylene layer.

10. The earpiece of claim 1, wherein the earpiece is configured so that the speaker is positionable proximal to an ear of a user relative to the self-supporting substrate.

11. A headset, comprising a headpiece associated with an earpiece, the earpiece, including:
    a speaker suitable for use within or adjacent to an ear canal of a user; and
    a layered composite associated with the speaker, the layered composite, including:
    an expanded polytetrafluoroethylene layer with a pore size having an average value from 0.1 micron to 0.5 micron;
    a self-supporting substrate applied to a first side of the expanded polytetrafluoroethylene layer, wherein the self-supporting substrate defines a contour of the earpiece, and
    a fabric substrate applied to a second side of the expanded polytetrafluoroethylene layer.

12. The headset of claim 11, wherein the headset further comprises a microphone associated with the headpiece.

13. A method of manufacturing an earpiece, comprising:
    treating expanded polytetrafluoroethylene layer with an oleophobic composition, a hydrophobic composition, or both the oleophobic composition and the hydrophobic composition, wherein the expanded polytetrafluoroethylene layer has a pore size having an average value from 0.1 micron to 0.5 micron;
    forming a layered composite by laminating a second side of the expanded polytetrafluoroethylene layer to a fabric layer, and bonding a first side of the expanded polytetrafluoroethylene layer to a self-supporting substrate which includes a perforated metal or polymeric substrate having a structure that defines a contour of the earpiece to form a layered composite; and
    positioning the layered composite adjacent to a speaker.

14. The method of claim 13, wherein forming the layered composite includes laminating followed by bonding.

15. The method of claim 13, further comprising positioning a polymeric abrasion-resistant shell adjacent to the fabric substrate at an opposite surface thereof relative to the expanded polytetrafluoroethylene layer.

* * * * *